April 24, 1962     R. L. DEGA     3,030,800
LIP SEAL GAUGE

Filed Nov. 12, 1958     2 Sheets-Sheet 1

INVENTOR.
Robert L. Dega
BY
ATTORNEY

April 24, 1962 R. L. DEGA 3,030,800
LIP SEAL GAUGE
Filed Nov. 12, 1958 2 Sheets-Sheet 2
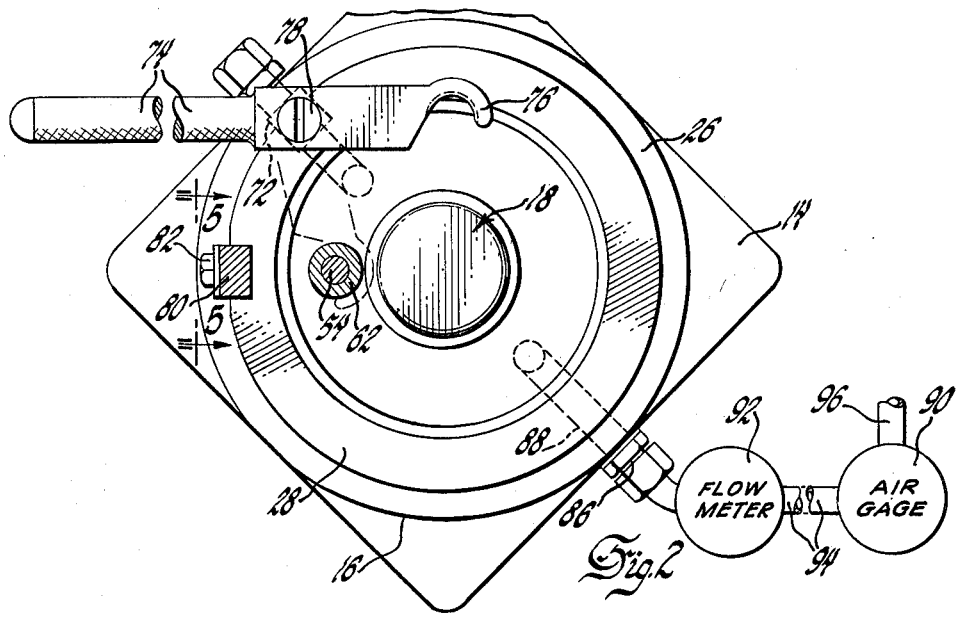
INVENTOR.
Robert L. Dega
BY
ATTORNEY

United States Patent Office 3,030,800
Patented Apr. 24, 1962

3,030,800
LIP SEAL GAUGE
Robert L. Dega, Utica, Mich., assignor to General Motors Corporation, Detroit, Mich., a corporation of Delaware
Filed Nov. 12, 1958, Ser. No. 773,284
11 Claims. (Cl. 73—37.5)

This invention relates to measuring instruments and more particularly to a device for measuring the lip diameters and lip pressures of lip type seals.

In the design and development of lip seals, and in the design and development of parts in which this type of seal is used, it is necessary to have accurate dimensions and to have test parts with accurate known dimensions. Lip seals manufactured in quantity will have a varying range of critical dimensions, such as the lip diameter, because of the method of manufacture necessary for volume production. Heretofore, a convenient and accurate method of determining these dimensions has not been presented, and in a development where quality and accuracy are important, such a device is required.

The device in which this invention is embodied comprises a piston, a cylinder, and a tapered mandrel for determining the critical lip diameters of lip seals and to determine the lip pressures in order to calculate various other design parameters. In using the device it is possible to get accurate dimensions within the range necessary for design and development of lip seals and the design and development of the parts in which the seals are used. The device presents a simple process of obtaining the necessary information and is inexpensive to manufacture and operate.

FIGURE 2 is a plan view of a portion of the device shown in FIGURE 1 taken along the line 2—2 and looking in the direction of the arrows.

FIGURE 3 is a sectional view of the device in FIGURE 1 taken substantially along the line 3—3 and looking in the direction of the arrows.

FIGURE 4 is a cross-sectional view of another portion of the device of FIGURE 1 taken along the line 4—4 and looking in the direction of the arrows.

FIGURE 5 is a fragmentary view taken on line 5—5 of FIGURE 2.

Figure 1:
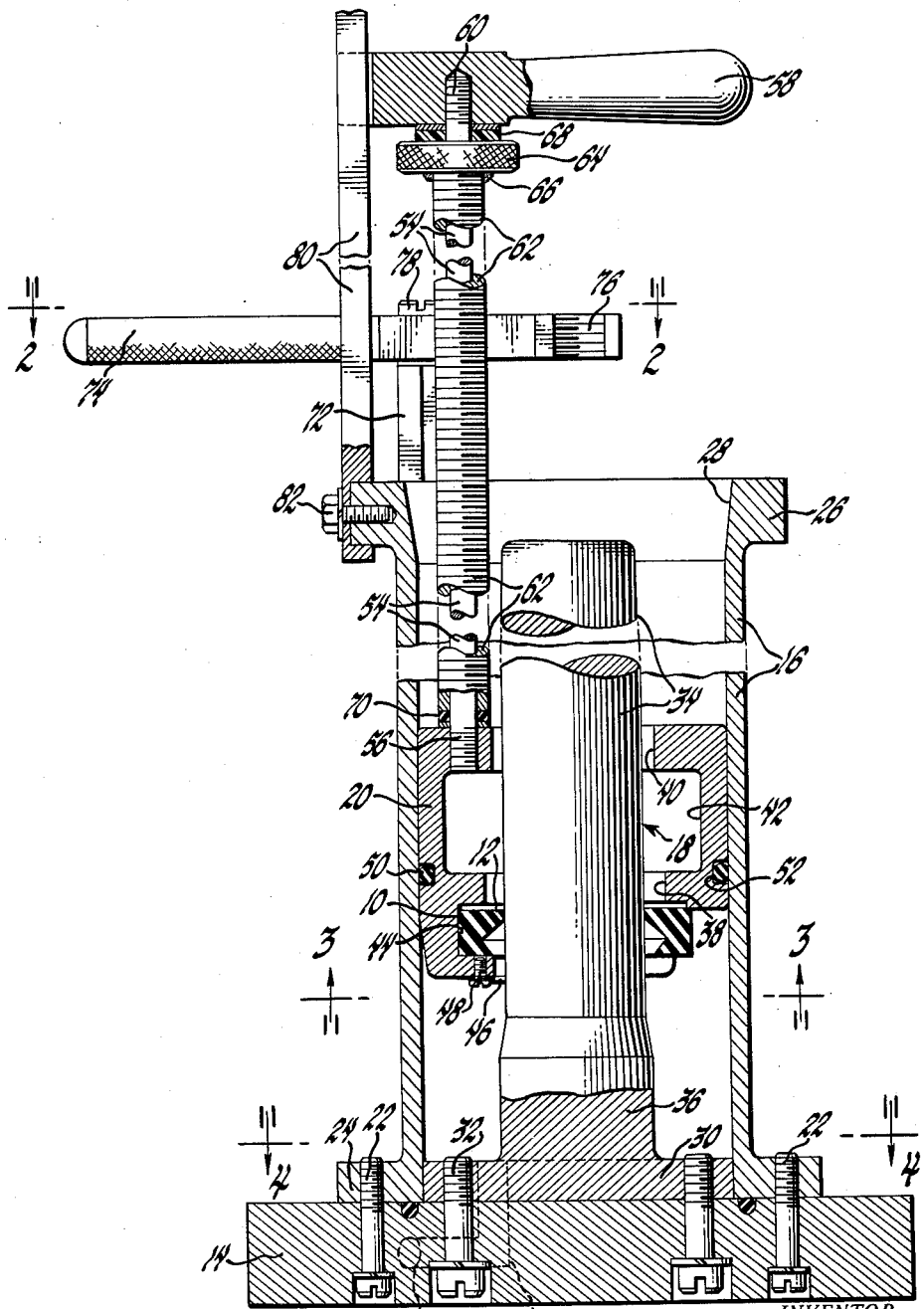
FIGURE 1 is an elevational view of the device with portions broken away and in section to illustrate the relative location of the parts.

Referring more particularly to the drawings, FIGURE 1 best shows the construction of the measuring instrument. The lip seal 10 to be measured is an annular seal, made of rubber or the like, which has an inwardly extending flange 12, referred to as the lip. The lip 12 is adapted to surround a shaft, or other part with which the seal is used, and prevent the passage of oil or water between the seal and the shaft.

The measuring device consists generally of a base 14, and which forms a fixed measuring chamber a cylinder 16, a mandrel 18 and a piston 20. The cylinder 16 is secured to the base 14 by a plurality of bolts 22 which pass through the base and are secured in the flange 24 formed at the end of the cylinder 16. The cylinder extends upwardly and terminates in a radial flange 26. The internal upper surface 28 of the cylinder is slightly tapered for ease in inserting the piston 20 in the cylinder.

The mandrel 18 is supported on a flange 30, secured to the base 14 by the bolts 32. The upper portion 34 of the mandrel is slightly tapered, the smaller end of the taper being the upper end of the mandrel, and the lower portion 36 of the mandrel is cylindrical in shape and formed to the mean diameter of the shaft with which the particular seal is to be associated. The tapered mandrel 18 and the cylinder 16 are concentrically disposed with respect to each other on the base 14.

The piston member 20 is slidingly received within the cylinder 16 and about the tapered mandrel 18. The lower passage 38 and the upper passage 40 surround the tapered mandrel 18 and are separated by a central chamber 42. The purpose of the openings and the chamber will be later described. A lateral opening 44 in the lower portion of the piston receives the lip seal 10, the seal being retained therein by very light spring pressure from the spring 46. The spring is secured to the piston by a plurality of bolts 48. An O-ring 50, secured in an annular groove 52 in the side of the piston, provides a fluid tight engagement between the piston and the cylinder 16.

To actuate the piston, a push rod 54 is threadedly received in the piston, as at 56, the other end of the rod being secured in the handle 58 by the threads 60. Thus, the handle 58 and push rod 54 may be manually moved upwardly or downwardly in order to advance or retract the piston 20 within the cylinder 16.

In order to get a fine adjustment of the position of the piston 20 along the tapered mandrel 18, a threaded tube 62 extends between the piston 20 and the handle 58. The threaded tube 62 is preferably coaxially disposed with the push rod 54 and has a thumb screw 64 secured to the upper end thereof. The thumb screw 64 may be attached in any way, such as by welding as at 66, and turning the thumb screw will turn the threaded tube 62. Suitable bearing blocks 68 and 70 are provided between the thumb screw and the handle and between the end of the threaded tube and the piston 20, respectively.

A post 72 is secured to the upper end of the cylinder 16 and has mounted thereon a lever 74 which extends to, and terminates in, a half-nut portion 76. The lever 74 is pivotally secured to the post 72 by the bolt 78. The half-nut portion 76 has an internal thread of the same size as the threads on the tube 62 and it may be seen that by pivoting the lever 74 to engage the half-nut 76 and the tube 62, the thumb screw 64 may be rotated to advance or retract the piston 20 in the cylinder 16.

Also mounted on the upper flange 26 of the cylinder 16 is a scale 80, secured to the flange by a bolt 82. The scale extends upwardly and adjacent the handle 58 and serves as a means of measuring the advance of the piston 20 in the cylinder 16 and the size of the mandrel at a particular seal location. The scale 80 may be calibrated as indicated at 81 in FIGURE 5 either in terms of linear distance along the tapered mandrel 18, or directly in terms of the diameter of the tapered mandrel at various points along the length thereof. It may be seen that by advancing or retracting the piston 20 in the cylinder 16, the handle moves the same amount and its movement may be marked or gauged along the scale 80.

Air inlet conduits 84 and 86 are provided in the base 14 and communicate through the passages 85 and 88 with the lower portion of the cylinder 16. The conduit 86 is operably connected to a flow meter 92 which in turn is connected to an air gage 90 through a conduit 94. A conduit 96 supplies air to the air gage and to the flow meter and thence to the cylinder 16 from a suitable source. A suitable means for controlling the line pressure, such as a conventional control valve (not shown), is provided. Only one of the conduits 84 or 86 would be used, the other being plugged or capped as illustrated in FIGURES 2 and 4. The air gage 90 and the flow meter 92 may be of any well known construction, the purpose and operation of which will be later described.

In measuring the lip diameter and the lip pressure of the seal, the operation of the device is as follows: The piston 20 is removed from the cylinder 16 and a lip seal 10 is inserted in the lateral opening 44 in the bottom of the piston in such a manner that the seal lip is away from the air flow. The piston, seal and push rod assembly is then replaced in the cylinder 16 and about the tapered mandrel 18. Air pressure is allowed to enter the cylinder 16 through the passage 86. It will be noted that as the lip seal 10 is positioned over the small end of the tapered mandrel an annular orifice is defined between the innermost edges of the lip and the tapered mandrel. Air is prevented from passing between the piston and the walls of the cylinder by the O-ring 50. Thus, the only passage of air is through the annular orifice defined by the seal and the mandrel, through the opening 38 in the lower portion of the piston into the chamber 42 in the piston, and to the atmosphere through the opening 40 in the piston. The inner chamber 42 provides for an expansion of the air, making it easier to move the piston and lip seal assembly along the mandrel.

The air pressure entering the cylinder 16 through the conduit 86 is held at a steady value such that as the piston and lip seal are pushed downwardly along the tapered mandrel by the handle 58 and push rod 54, the orifice between the lip seal and the tapered mandrel will decrease in size, thus decreasing the flow from the cylinder 16. When the piston 20 and the lip seal 10 are approximately in the proper position on the mandrel, the thumb screw 64 and the threaded tube 62 may be rotated, after pivoting the half-nut member 76 into engagement therewith, for micrometer adjustment of the piston and seal along the mandrel 18. When the air flow, as noted on the flow meter 92 reaches a predetermined value the lip seal will then be positioned at a point on the tapered mandrel 18 at which the diameter of the mandrel is the same as the diameter of the seal lip. In this position the amount of advance may be observed from the position of the handle 58 with respect to the scale 80. If the scale is calibrated in terms of length, a simple mathematical conversion gives the exact seal diameter. However, if the scale is calibrated in terms of mandrel diameters the reading will be direct from the scale 80.

In measuring the lip pressure, which may indicate the quality of various seal parameters, such as elasticity and uniformity of the material, the piston and lip seal are advanced to the lower portion 36 of the mandrel 18. This portion is the same diameter as the mean diameter of the shaft with which the seal is expected to be used. The pressure of the air entering the cylinder through the passage 86 is then increased to a point at which the seal lip pulls away from the cylindrical portion 36 of the mandrel 18. The line pressure control valve provides means for increasing the pressure. The amount of pressure may be indicated from the gage 90 and the seal pressure determined.

Thus, it may be seen that a relatively inexpensive and simple means and method have been described by which the critical lip diameter and lip pressure may be determined for a lip seal.

I claim:

1. Means for measuring seal diameters comprising a base, a cylinder mounted on said base, a tapered mandrel secured to said base and extending concentrically within said cylinder, a piston movable in said cylinder and about said mandrel and adapted to receive a seal for movement therewith, a push rod secured at one end to said piston and having a handle at the opposite end thereof to slide said piston and said seal in said cylinder and along said mandrel, externally threaded means extending between said piston and said handle and internally threaded means secured to said cylinder to permit mechanical adjustment of said piston and said seal along said mandrel, a scale secured to said cylinder and extending adjacent said handle to indicate the position of said piston and said seal along said mandrel, and means for admitting air under pressure to said cylinder to flow between said seal and said mandrel when said seal is positioned along the smaller end of said tapered mandrel, the air flow between said seal and said mandrel reaching a predetermined value when said seal is advanced along said mandrel by said push rod and said handle and by said internally and externally threaded means to a position where said mandrel is of a diameter substantially equal to the diameter of said seal.

2. A gage for measuring lip seal diameters comprising a base, a cylinder mounted on said base, a mandrel mounted on said base and concentric with said cylinder, said mandrel having a lower cylindrical portion and an upper tapered portion, a piston slidable in said cylinder and about said mandrel and adapted to receive and carry a lip seal therewith, first means operatively connected to said piston for positioning said piston and said lip seal along said mandrel, second means operatively connected to said piston for mechanical adjustment of said piston and lip seal along said mandrel, means for admitting air under pressure into said cylinder to flow between said mandrel and said lip seal when said piston and lip seal are positioned along the smaller end of said mandrel, the flow between said seal and said mandrel reaching a predetermined value when said piston and lip seal are positioned on said mandrel at a point where the diameter of said mandrel is equal to the diameter of said lip seal, and means mounted on said cylinder to indicate the position of said piston and said lip seal along said mandrel to determine the diameter of said lip seal.

3. The gage for measuring lip seal diameters set forth in claim 2 wherein said means mounted on said cylinder to indicate the position of said piston and said lip seal comprises a scale upwardly extending from said cylinder and adjacent said handle, said scale having units of linear length scribed thereon.

4. The gage for measuring lip seal diameters set forth in claim 2 wherein said means mounted on said cylinder to indicate the position of said piston and said lip seal comprises a scale upwardly extending from said cylinder and adjacent said handle, said scale having markings thereon corresponding to the diameter of said tapered portion of said mandrel at various positions of said piston along the length of said mandrel.

5. A lip seal gage for measuring lip seal diameters comprising a base, a tapered mandrel mounted on said base, a cylinder mounted on said base and concentrically located around said mandrel, a piston slidable in said cylinder and on said mandrel, means on said piston for retaining a lip seal in close fitting engagement with said tapered mandrel, a rod secured at one end to said piston and having a handle at the other end thereof to manually advance said piston and said lip seal along said tapered mandrel, an externally threaded tube surrounding said rod and relatively rotatable thereon, an internally threaded half-nut and lever pivotally secured to said cylinder and adapted to be pivoted into engagement with said externally threaded tube, means associated with said threaded tube to turn said tube when said half-nut and lever is engaged therewith to mechanically advance said piston and said lip seal along said mandrel, means for supplying air under pressure to said cylinder, means for indicating the flow between said seal and said mandrel as said piston and said lip seal are advanced along said mandrel, and a scale mounted on said cylinder and adjacent said handle to indicate the amount of travel of said piston and said lip seal along said mandrel to a point where the air flow between said lip seal and mandrel reaches a predetermined value to indicate the diameter of said lip seal.

6. A method of determining the diameter of a seal comprising the steps of inserting the seal in an opening in the lower end of a piston, inserting said piston and said seal in a cylinder having a closed end and over an increasingly tapered mandrel such that an annular clearance exists between said seal and said mandrel, admitting air under pressure to said cylinder between said closed end and said piston and allowing said air to flow through said annular clearance, advancing said piston and said seal along said tapered mandrel thereby restricting the size of said annular clearance until a predetermined air flow occurs between said seal and mandrel and determining the extent of advancement of said piston and said seal along said tapered mandrel from some predetermined position for calculating the diameter of said seal.

7. Seal testing apparatus for measuring seal diameters comprising a measuring chamber, a tapered mandrel mounted within said chamber, means for mounting a seal within said chamber concentrically with said mandrel and radially spaced therefrom to provide a clearance area therebetween, means for moving the seal and mandrel relative to each other to vary the size of the clearance area therebetween, means for supplying fluid under pressure to said chamber for flow through said clearance area, and means for measuring the size of said mandrel at the location of the seal when the fluid flow through said clearance area reaches a predetermined value.

8. Seal test apparatus for measuring seal diameters comprising a fixed chamber a tapered mandrel fixedly secured within said chamber, a piston movable in said chamber about said mandrel, means for mounting a seal on said piston for movement therewith and concentrically with said mandrel and radially spaced therefrom to provide a clearance area therebetween, means for advancing said piston and a seal along said mandrel to vary the size of the clearance area between the seal and mandrel, means for supplying fluid under pressure to said chamber for flow through said clearance area, and means for measuring the size of said mandrel at the location of the seal when the fluid flow through said clearance area reaches a predetermined value.

9. Seal testing apparatus for measuring the diameter and lip pressure of a lip seal comprising a fixed cylinder, a mandrel rigidly secured within said cylinder and including a tapered portion for measuring lip seal diameter and a concentric cylindrical portion for measuring lip seal pressure, a piston movable in said cylinder about said mandrel, means for securing a seal on said piston for movement therewith and concentrically with said mandrel and radially spaced from said mandrel to provide a clearance area therebetween, means for first advancing said piston along said mandrel tapered portion to vary the size of the clearance area between the seal and said mandrel tapered portion and then onto said mandrel cylindrical portion to place the latter in close fitting engagement with the seal, means for supplying fluid under substantially constant pressure to said cylinder for flow through said clearance area, means for measuring the diameter of said mandrel tapered portion at the location of the seal when the fluid flow through said clearance area reaches a predetermined value, means for increasing the pressure of the fluid in said cylinder after the piston and seal are advanced to a position surrounding the mandrel cylindrical portion, and means for measuring the pressure in said cylinder when the seal moves away from said mandrel cylindrical portion.

10. A method of determining the diameter of a seal comprising the steps of mounting a seal concentrically with a tapered mandrel within a chamber so that there is an annular clearance area between said seal and mandrel forming an outlet from the chamber, supplying fluid under pressure to the chamber for flow through said clearance area, moving the seal and mandrel relative to each other to change the size of the clearance area until the seal reaches a certain position on the mandrel in which a predetermined air flow occurs through said clearance area, and measuring the seal diameter in relation to the diameter of said mandrel at said certain position.

11. A method of determining the diameter of a seal comprising the steps of mounting a sal around a tapered mandrel within a chamber so that there is an annular clearance area between said seal and mandrel forming an outlet from the chamber, supplying fluid under substantially constant pressure to the chamber for flow through said annular clearance area, advancing said seal along the mandrel thereby restricting the size of said annular clearance area until the seal reaches a certain position on said mandrel in which a predetermined air flow occurs through said annular clearance area, and measuring a seal diameter in relation to the diameter of said mandrel at said certain position.

References Cited in the file of this patent
UNITED STATES PATENTS

| | | |
|---|---|---|
| 146,974 | Allen | Feb. 3, 1874 |
| 2,696,730 | Justice | Dec. 14, 1954 |